United States Patent [19]

Snaper

[11] Patent Number: 4,595,916
[45] Date of Patent: Jun. 17, 1986

[54] INTEGRAL WATER SENSING AND DETECTING DEVICE

[76] Inventor: Alvin A. Snaper, 2800 Cameo Cir., Las Vegas, Nev. 89107

[21] Appl. No.: 578,117

[22] Filed: Feb. 7, 1984

[51] Int. Cl.⁴ ............................................. G08B 21/00
[52] U.S. Cl. .................. 340/604; 244/135 R; 340/620; 340/636; 340/691; 340/945; 429/90
[58] Field of Search ............... 340/604, 602, 603, 620, 340/785, 805, 691, 815.26, 636, 701, 945; 73/304 R, 61.1 R; 429/90, 91, 92, 93

[56] References Cited

U.S. PATENT DOCUMENTS

| Re. 29,250 | 6/1977 | Tanaka | 340/765 X |
|---|---|---|---|
| 813,931 | 2/1906 | Wotton | 340/815.26 |
| 1,497,388 | 6/1924 | Sterling | 429/91 X |
| 3,451,055 | 6/1969 | Pihl | 340/815.26 |
| 4,067,185 | 1/1978 | Huguenin | 340/765 X |
| 4,304,132 | 12/1981 | Snaper | 340/620 X |

Primary Examiner—James L. Rowland
Assistant Examiner—Daniel Myer
Attorney, Agent, or Firm—Donald D. Mon; David O'Reilly

[57] ABSTRACT

A device for detecting the presence of water in a fuel tank comprising a fitting mounted at the lower most portion of said tank having a water sensing alloy on said fitting. The fitting positions the water sensing alloy in the tank in the position where water will tend to collect. The fitting also includes an integrally mounted indicating device such as a go/no-go device or a meter to determine the presence of water in the tank. The length by which the fitting extends into the tank can be used to determine the depth of water in the tank and when the amount of water collected at the bottom or sump of the tank exeeds a predetermined depth it will be detected by the indicator connected externally to the water sensing alloy. A useful water sensing alloy is comprised of a composition of lead, tin, and zinc each being present in an amount of between about 20–45% by weight, with the composition also containing small amounts of up to about 0.1% of copper and/or up to about 1% of either samarium, ruthenium, vanadium or selenium.

3 Claims, 3 Drawing Figures

INTEGRAL WATER SENSING AND DETECTING DEVICE

BACKGROUND OF THE INVENTION

This invention relates to devices for detecting and removing water which may contaminate fuel in storage tanks.

The presence of water in gasoline and other fuels can, if it is drawn into the fuel supply system, cause serious problems. For example in internal combustion engines, especially for aircraft, water can cause serious engine malfunction, and even stall the engine. For this reason, many fuel tanks, and all aircraft fuel tanks, are provided with sump drains for draining water from the tanks. The water collects at the bottom, because it is immiscible and its specific gravity is greater than that of gasoline. The technique is usually to open a petcock and drain some liquid from the tank. If only gasoline flows out (and this can be observed by its color), the valve is closed. If only water is withdrawn, flow is continued until gasoline leaves the valve. Then the valve is closed. In both situations, gasoline is wasted, and usually drips on the ground, and often onto the mechanic or pilot. This is wasteful, messy, and hazardous. It would be advantageous to open the drain only if there were water present, and sometimes only if excessive water were present. Then the valve would not be opened unnecessarily. Because of the volatility of the gasoline, it is very desirable that a voltage not be applied to a test circuit to determine the presence or absence of water. Instead, the device should be self-generating, and passive relative to the gasoline.

A device for detection of water in a fuel tank is described and disclosed in U.S. Pat. No. 4,304,132. However, a disadvantage of the device disclosed in this patent is the necessity of connection and disconnection of a meter to test each tank. The disadvantage of this system is that some aircraft will have numerous fuel tanks making testing of each tank time consuming and tedious. Multiplying this by the number of aircraft which need daily checks, obviously could be a time consuming process. It would be advantageous if excess water in a tank could be detected simply by a quick visual inspection alone.

SUMMARY OF THE INVENTION

This invention is an improvement on the device disclosed and described in U.S. Pat. No. 4,304,132 incorporated herein by reference, issued to the same inventor as that disclosed herein and is for the purpose of determining and detecting the presence of water in fuel storage tanks, and if desired, to indicate approximately the amount of water in the tank.

The invention makes use of an alloy which has the property of generating an electrical current when in contact with water. The alloy is attached to the end of a fitting mounted at the lower most portion of the fuel tank where water will collect. Optionally, the alloy can be arranged to indicate the depth or amount of water which has collected in the tank. The fitting passes through the base or wall of the tank, and includes a socket for receiving an integrally mounted indicating device providing an instantly recognizable indication of excess water from current produced by the water sensing alloy. The indicating device is preferrably a go/no-go "flag" which is readily visible. U.S. Pat. Nos. 4,107,997 and 4,304,132 disclose an alloy of different composition which generates a current when contacted by water.

Preferably, the fitting on which the water sensitive alloy is counted has a socket for receiving a small go/no go "flag type meter to the water sensing alloy. The meter simply changes color to visually indicate excess water. Thus the water level in storage tanks can periodically be checked by visual inspection to see if the "flag" is "on". This device is particularly advantageous in aircraft fuel tanks where a maintenance mechanic can routinely check all fuel by quick visual inspection in a short period of time, without opening any drain valve unless there is water to be drained out. When the indicator is "on" indicating excessive water in the fuel tank, the excess water can be quickly removed by opening the drain valve for a short period of time. Draining the water to below the alloy turns the indicator "off" restoring the tank and aircraft to a "go" condition.

An object of the present invention is to provide an integrally installed water detecting device which can be visually inspected at will to check for the presence of excess water in a fuel tank without opening the drain valve.

Above and other features of the invention will become apparent from the following detailed description and the accompanying drawings, in which:

DETAILED DESCRIPTION OF THE INVENTION

Figure 1:
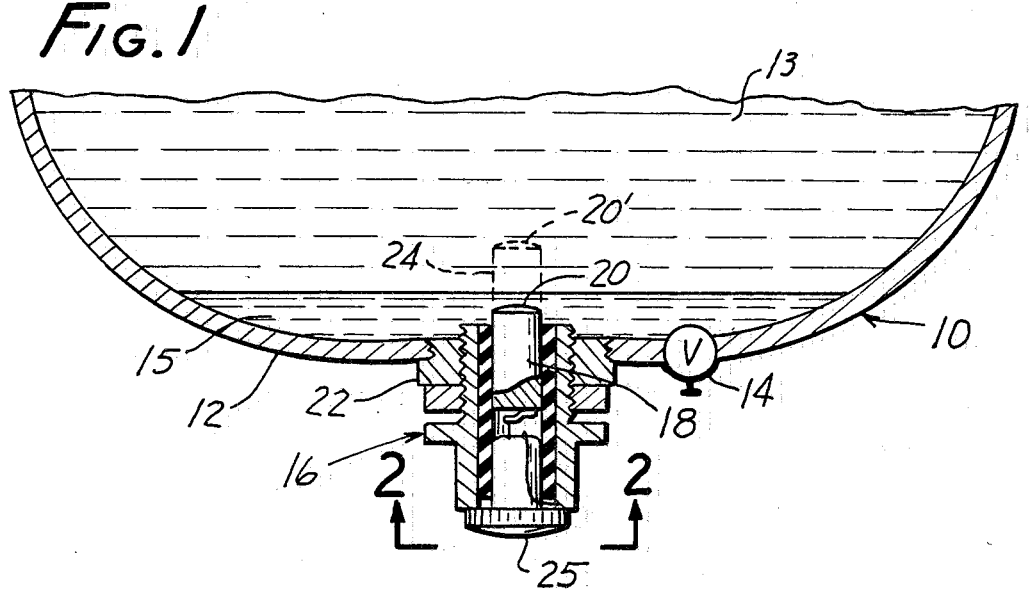
FIG. 1 illustrates, somewhat schematically, a fuel tank with the water detecting device therein and an integrally installed indicator.

A device for use in a fuel tank to detect water condensed or collected in a tank is illustrated in FIG. 1. A unique advantage of this device is that it excludes any galvanic or outside-the-tank-voltage source. Because of the volatile nature of fuels and extreme danger of explosions the elimination of outside voltage sources can be extremely important for safety reasons.

In FIG. 1, a fuel tank 10 having a sump 12 for collecting water condensing in the fuel is shown. The fuel tank 10 is also provided with the usual drain or bleed valve 14 for draining off undesired liquids 15 such as water in the fuel 13. This draining is accomplished by opening valve 14 and allowing fluid to flow until the fluid flowing appears to be completely fuel. For obvious reasons this is not only wasteful but can be dangerous as well.

To eliminate the need for this trial and error procedure, the water sensing device 16 of the present invention is provided. The water sensing device 16 is comprised of a body 18 having a threaded end for connection to the tank. A water sensitive alloy 20 on the end of the body is positioned in the fuel tank 10.

The water sensing device 16 is threaded into a fitting 22 that passes through the bottom of the tank at a sump 12. The sump is at the lowest point in the tank. Water 15 will collect at this lowermost point, where it will contact alloy 20.

Alloy 20 is a composition which is comprised of lead, tin, and zinc each being present in an amount of between about 20 and about 45% by weight. The composition also contains amounts of up to about 0.1% of copper, and/or up to about 0.1% of samarium, ruthenium, vanadium, or selenium, the preferred range being between about 0.001% and 0.1% of said copper and/or of one of said samarium, ruthenium, vanadium, or selenium.

The foregoing alloys are similar in nature and function to those described in U.S. Pat. No. 4,017,997, and the proportions, methods of compounding, criteria for selection of chemical components, and suitable compounds of samarium, ruthenium, vanadium, and selenium are entirely analogous to those described in the said patent, with compounds of samarium, ruthenium, vanadium, or selenium substituted for those of tellurium. Therefore, the latter patent is incorporated herein by reference in its entirety for its disclosure of the details of a suitable alloy and of how to make it.

The alloy is connected into a two-wire circuit wherein one wire connects to the alloy, and the other connects to the conductive body. The alloy and the body are insulated from one another, and both will be contacted by water when it is present. The body 18 and alloy 20 are in turn connected to integrally mounted "flag" type indicator 25.

Figure 2:
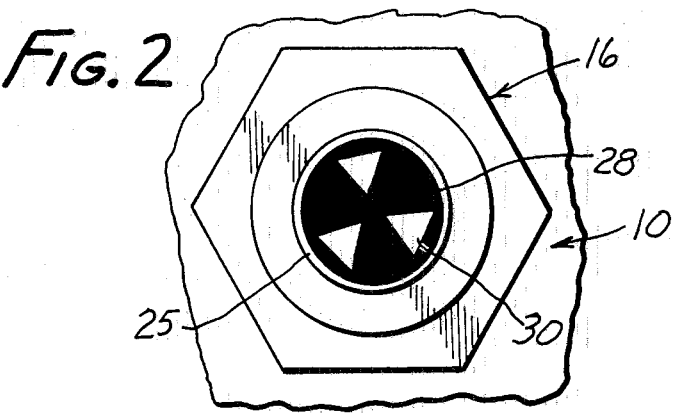
FIGS. 2 and 3 are views taken at 2—2 of FIG. 1 illustrating how the integral indicator is a "flag" which provides instant visual indication of the presence of excess water.
Figure 3:
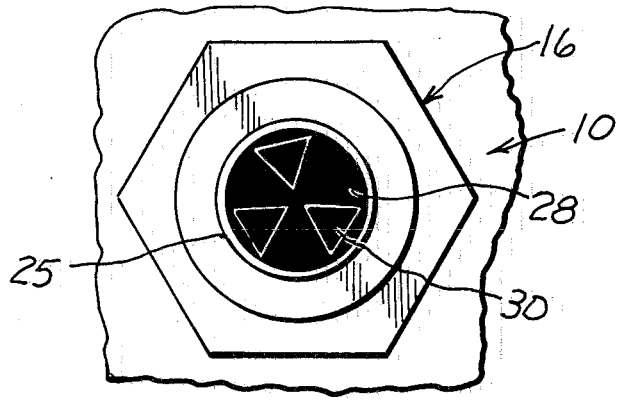

The indictor 25 is shown in FIGS. 2 and 3 and is comprised of a face plate 28 having triangular windows 30 which normally are the same color as the face plate. When an excess of water is detected the triangular windows 30 change color to provide an instantly recognizable contrast and go/no-go indication. The indicator 30 may be a simple built-in "flag" type meter such as a Model 580 go/no-go indicator available from Mercer Electronics of Elgin, Ill. Alternatively the meter could be a small Model 580 battery level meter also available from Mercer Electronics. The battery level meter might have a slight advantage because it has a sight line and indicates relative current flow, it also has a disadvantage because it might not be as easily recognized as the simple sharply contrasting, go/no-go indicator.

The water sensing device 16 is installed in fuel tanks for detecting the amount of water collected in the tank. The water collected in the tank can be checked by simply observing the integrally mounted meter 25. If the triangular windows are the same color as the face plate then the amount of water in the tank is in a safe range. If the triangular windows have changed color (usually white on black for the sharp contrast) then excessive water is present.

The presence of water in the tank 10 is determined by the color of the triangular windows 30. As it happens, the current generated by these alloys is directly proportional to the area contacted by water. If there is no contact, there is no current. If there is contact, then the greater the area of contact, the greater is the current produced. Accordingly, the amount (depth) of water can be read out if the alloy surface is properly positioned and proportioned. For example, alloy 20 can be shaped as shown by phantom line 20' with an elongated shape 24. The tubular, vertical wall will have an increasing area contacted by water as the water level rises, and this depth can be indicated if the battery level sight line meter is used.

In operation, when one wishes to check for water, or to check the amount of water in the fuel tank, the meter 25 is inspected. If the "flag" (i.e. window) has changed color or sight line indicates a reaction, then there is excess water. The voltage produced will be constant at approximately ¾ volt, and the current produced by the water sensing alloy will be approximately proportional to the amount of surface area of the alloy provided which is wetted by the water. The alloy is mildly hydrophobic, and will provide an indication on the battery level type meter of the amount of water in the tank 10 when configuration 24 is used. If only presence or absence of water is to be determined, the lower profile will be used with the "flag" type meter. When water is to be drained, valve 14 is opened. However, it is not opened unless the meter reading shows it to be necessary. Thus needless waste of fuel which occurs in the trial and error method of drainage is eliminated.

An alternative to the elongated shape 24 is to place the water sensing device 16 in the tank at some point above the lowermost point, such that when water reaches that level it will contact the sensing alloy 20.

This invention is not to be limited by the embodiments shown in the drawings and described in the description, which are given by way of example and not of limitation, but only in accordance with the scope of the appended claims.

I claim:

1. A device for detecting the presence of water in a volume of stored fuel comprising;
   an aircraft fuel tank for storing said fuel;
   a water sensing alloy consisting essentially of between about 20% and 45% each by weight lead, tin and zinc, and between about 0.001% and about 0.1% by weight from the group consisting of copper, samarium, vanadium, and selenium;
   mounting means for mounting said water sensing alloy comprised of a threaded body threaded into and passing through said aircraft fuel tank approximate the lowermost portion of said aircraft fuel tank;
   conductive means connected to said water sensing alloy for conducting current generated thereby as a consequence of contact with water,
   integrally mounted miniature indicating means connected to said conductive means, said threaded body including a socket exposing said conductive means for receiving said integrally mounted indicating means; said miniature indicating means having a face plate and a plurality of windows, said face plate and said windows having normally matching colors when the water level in said aircraft fuel tank is safe; said windows changing color when there is an excess of water in the tank whereby the presence of water in said tank is indicated by said indicating means.

2. Apparatus according to claim 1 wherein said body positions said alloy at a predetermined depth in said tank, whereby the presence of water at said depth can be detected.

3. Apparatus according to claim 1 in which said alloy extends vertically in said tank for a substantial distance, whereby the depth of water can be measured as a consequence of area alloy contacted by water.

* * * * *